United States Patent
Carpino, II (10) Patent No.: US 12,110,117 B2
(45) Date of Patent: Oct. 8, 2024

(54) HEATED PENDULUM DAMPER

(71) Applicant: Goodrich Corporation, Charlotte, NC (US)

(72) Inventor: Richard J. Carpino, II, Canton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 637 days.

(21) Appl. No.: 17/408,694

(22) Filed: Aug. 23, 2021

(65) Prior Publication Data

US 2023/0059844 A1 Feb. 23, 2023

(51) Int. Cl.
*B64D 15/12* (2006.01)
*B64C 27/00* (2006.01)
*H05B 3/18* (2006.01)
*B64C 29/00* (2006.01)

(52) U.S. Cl.
CPC ............ *B64D 15/12* (2013.01); *B64C 27/001* (2013.01); *H05B 3/18* (2013.01); *B64C 2027/003* (2013.01); *B64C 29/0033* (2013.01); *H05B 2214/02* (2013.01)

(58) Field of Classification Search
CPC ............ B64C 2027/003; B64C 27/001; B64C 29/0033; B64D 15/12; H05B 2214/02; H05B 3/18
USPC .......................................... 219/644, 635, 643
See application file for complete search history.

(56) References Cited

U.S. PATENT DOCUMENTS

| | | | |
|---|---|---|---|
| 3,540,809 A | 11/1970 | Paul et al. | |
| 6,494,680 B2 | 12/2002 | Cardin | |
| 7,604,202 B2 | 10/2009 | Froman et al. | |
| 8,550,402 B2 * | 10/2013 | Houlihan | B64D 15/14 244/134 D |
| 9,284,051 B2 * | 3/2016 | Amari | B64C 27/35 |
| 2004/0093953 A1 | 5/2004 | Gilkison et al. | |

FOREIGN PATENT DOCUMENTS

EP 2853872 A1 4/2015

OTHER PUBLICATIONS

"Firerod Cartridge Heaters Revolutionizing the Heater Industry"; Dec. 31, 2013; XP055174742; Retrieved from the I-net: URL:https://www.watlow.com/downloads/en/specsheets/stlfrc0413.pdf; Retrieved Mar. 9, 2015.
Anonymous: U.S. Marines MV-22B 166480 on display at Farnborough Air Show 2006; Jul. 18, 2006, XP093009583, Retrieved from the I-net: URL:https://commons.wikimedia.org/wiki/File:V-22-166480-FAR01.jpg, Retrieved on Dec. 20, 2022; Note pendulum dampers in the figure.
Extended European Search Report; EP Application No. 22190790.0-1004; dated Jan. 3, 2023; 12 pages.

* cited by examiner

*Primary Examiner* — Quang T Van (74) *Attorney, Agent, or Firm* — CANTOR COLBURN LLP (57) ABSTRACT

Pendulum dampers are described. The pendulum dampers include a damper body having a first end and a second end, with an axial direction defined between the first end and the second end with a heater bore passing through the damper body in the axial direction from a tail port at the second end toward the first end and a cartridge heater installed within the heater bore, the cartridge heater configured to generate heat and heat a material of the damper body.

20 Claims, 5 Drawing Sheets

HEATED PENDULUM DAMPER

BACKGROUND

The subject matter disclosed herein generally relates to pendulum dampers and, more particularly, to heated pendulum dampers and use thereof.

Tilt rotor applications often need pendulum dampers on the rotor system. Typically, there is one pendulum damper 180 degrees out of phase from each prop rotor. These dampers are in free air, outside of the diameter of the spinner cap, and require ice protection due to ice that accretes and can shed into the engine. Previous tilt rotor designs of pendulum dampers have used a composite heated shell to protect the dampers.

SUMMARY

According to some embodiments, pendulum dampers are provided. The pendulum dampers include a damper body having a first end and a second end, with an axial direction defined between the first end and the second end with a heater bore passing through the damper body in the axial direction from a tail port at the second end toward the first end and a cartridge heater installed within the heater bore, the cartridge heater configured to generate heat and heat a material of the damper body.

In addition to one or more of the features described herein, or as an alternative, further embodiments of the pendulum dampers may include a mounting bore passing through the damper body in a direction normal to the axial direction and separating the heater bore into a first heater bore and a second heater bore.

In addition to one or more of the features described herein, or as an alternative, further embodiments of the pendulum dampers may include a fastener configured to pass through the mounting bore to attach the damper body to an aircraft structure.

In addition to one or more of the features described herein, or as an alternative, further embodiments of the pendulum dampers may include that the cartridge heater is a first cartridge heater installed within the first heater bore, the pendulum damper further comprising a second cartridge heater installed within the second heater bore.

In addition to one or more of the features described herein, or as an alternative, further embodiments of the pendulum dampers may include that the first cartridge heater and the second cartridge heater each include wire to electrically connect the respective cartridge heater to an electrical controller.

In addition to one or more of the features described herein, or as an alternative, further embodiments of the pendulum dampers may include a tail element installed to the damper body and engaged into the tail port.

In addition to one or more of the features described herein, or as an alternative, further embodiments of the pendulum dampers may include that the damper body is a solid body of tungsten.

In addition to one or more of the features described herein, or as an alternative, further embodiments of the pendulum dampers may include a thermal paste disposed between the cartridge heater and the material of the damper body.

In addition to one or more of the features described herein, or as an alternative, further embodiments of the pendulum dampers may include that the cartridge heater has a power density of 10 W/in2.

In addition to one or more of the features described herein, or as an alternative, further embodiments of the pendulum dampers may include that the cartridge heater has a power density of 300 W/in2.

In addition to one or more of the features described herein, or as an alternative, further embodiments of the pendulum dampers may include a fastener connected to the damper body and configured to attach the damper body to an aircraft structure.

According to some embodiments, pendulum damper heater systems are provided. The pendulum damper heater systems include an electrical controller, a damper body having a first end and a second end, with an axial direction defined between the first end and the second end with a heater bore passing through the damper body in the axial direction from a tail port at the second end toward the first end, and a cartridge heater installed within the heater bore and electrically connected to the electrical controller. The electrical controller is configured to control an on state and an off state of the cartridge heater.

In addition to one or more of the features described herein, or as an alternative, further embodiments of the pendulum damper heater systems may include a mounting bore passing through the damper body in a direction normal to the axial direction and separating the heater bore into a first heater bore and a second heater bore.

In addition to one or more of the features described herein, or as an alternative, further embodiments of the pendulum damper heater systems may include a fastener configured to pass through the mounting bore to attach the damper body to an aircraft structure.

In addition to one or more of the features described herein, or as an alternative, further embodiments of the pendulum damper heater systems may include that the cartridge heater is a first cartridge heater installed within the first heater bore, the system further comprising a second cartridge heater installed within the second heater bore.

In addition to one or more of the features described herein, or as an alternative, further embodiments of the pendulum damper heater systems may include that the first cartridge heater and the second cartridge heater each include wire to electrically connect the respective cartridge heater to the electrical controller.

In addition to one or more of the features described herein, or as an alternative, further embodiments of the pendulum damper heater systems may include that the cartridge heater is controlled to heat to temperatures above 300° F.

In addition to one or more of the features described herein, or as an alternative, further embodiments of the pendulum damper heater systems may include that the cartridge heater is controlled to heat to temperatures above 1,000° F.

In addition to one or more of the features described herein, or as an alternative, further embodiments of the pendulum damper heater systems may include that the electrical controller is configured to be operably connected to a power source of an aircraft.

In addition to one or more of the features described herein, or as an alternative, further embodiments of the pendulum damper heater systems may include that the electrical controller cyclically switches between the on state and the off state of the cartridge heater.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
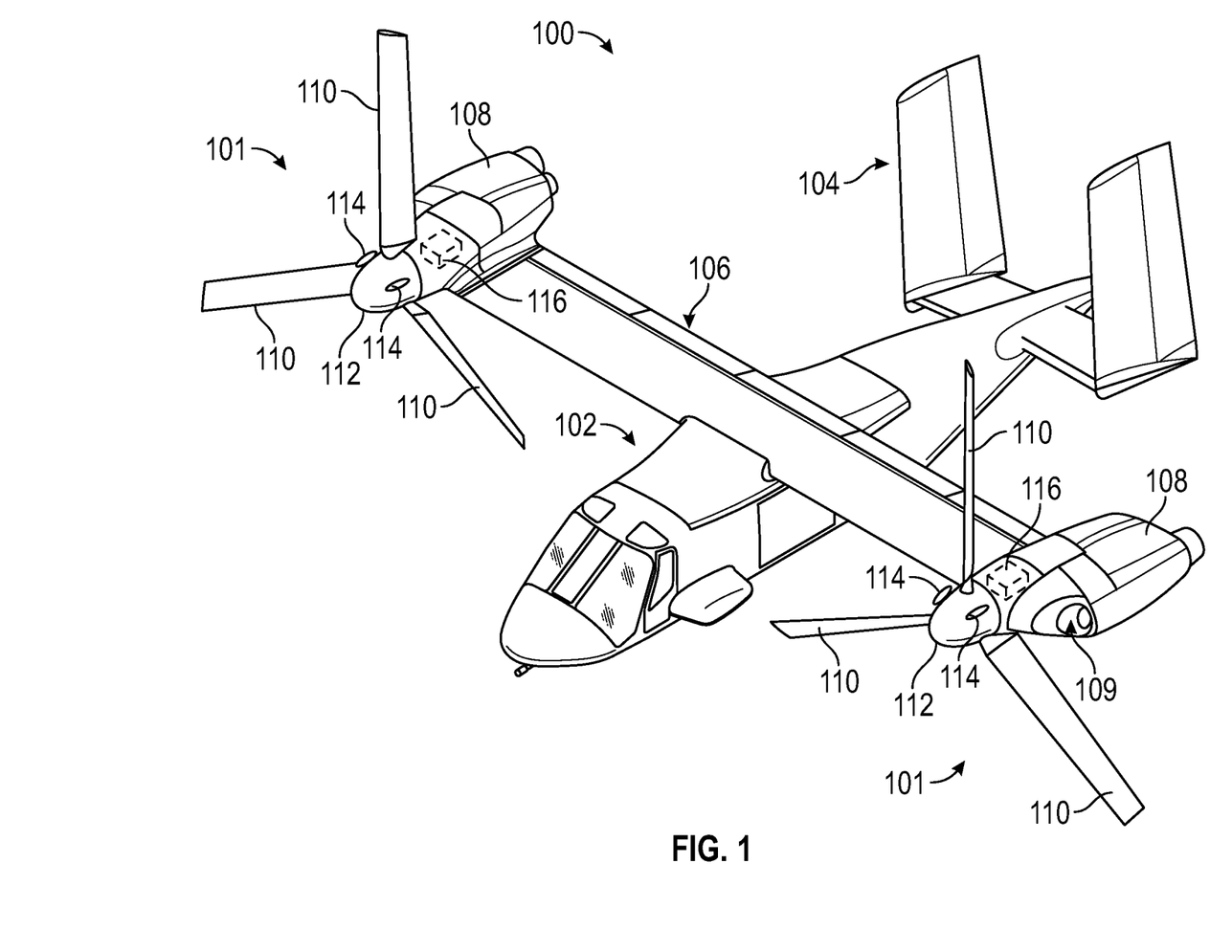
FIG. 1 is a schematic illustration of an aircraft that incorporates embodiments of the present disclosure.

Referring to FIG. 1, a schematic illustration of an aircraft 100 having tilt rotors 101 is shown. The aircraft 100 includes a fuselage 102, a tail member 104, and a wing member 106. The aircraft 100 includes two engines 108 mounted at ends of the wing member 106. Each engine 108 is configured to drive rotation of respective rotor blades 110 through a rotatable gearbox proprotor system 112. The position or orientation of the rotatable proprotor gearbox systems 112 as well as the pitch of the rotor blades 110 can be selectively controlled in order to selectively control direction, thrust, and lift of the aircraft 100. For example, the aircraft 100 may be configured for both forward flight or airplane mode (e.g., as oriented in FIG. 1) and vertical flight or helicopter mode, with the rotatable proprotor gearbox systems 112 rotated to face about 90 degrees from the angle shown in FIG. 1 (e.g., similar to a helicopter rotor orientation). It will be appreciated that the aircraft 100 can be operated such that rotatable proprotor gearbox systems 112 are selectively positioned between the airplane mode and the helicopter mode orientations to allow for both vertical and forward flight.

Although aircraft 100 is illustrated with two engines 108 and related rotatable proprotor gearbox systems 112, those of skill in the art will appreciate that other tiltrotor aircraft may employ embodiments disclosed herein, without departing from the scope of the present disclosure. For example, an alternative embodiment may include a quad-tiltrotor that has an additional wing member aft of the wing member 106, the additional wing member can have additional propulsion systems similar to engines 108 and rotatable proprotor gearbox systems 112. Further, although aircraft 100 is illustratively shown as a manned aircraft, embodiments of the present disclosure may be applied to unmanned tiltrotor aircraft.

During operation, the rotatable proprotor gearbox systems 112 may be subject to vibrations or resonance frequencies, and thus damping systems may be required to reduce vibrations and/or tune resonance frequencies to ensure such frequencies do not occur within the operation envelope of the aircraft 100. To reduce such vibrations, the rotatable proprotor gearbox systems 112 may include dampers 114. The dampers 114 are arranged about a nose cone structure opposite a respective rotor blade 110. As such, in the configuration of FIG. 1, the aircraft 100 includes three rotor blades 110 on each rotatable proprotor gearbox system 112 and a respective damper 114 is arranged 180 degrees opposite from the respective rotor blade about the nose cone structure of the rotatable proprotor gearbox systems 112. Illustratively shown are two of the three dampers 114 for each rotatable proprotor gearbox system 112.

Although the dampers are required for stability and vibration damping, these structures can accrete ice. If ice forms on the dampers, the ice may break and enter into the engines 108 through an engine inlet 109 which can damage components thereof. Accordingly, preventing ice accretion on the dampers is desirable. One solution that has been used is to coat or encase the dampers within a shell or casing that can be heated. The heating of such elements may be provided from one or more electrical controllers 116, shown in FIG. 1. The electrical controllers 116, in some configuration, may be mounted or arranged within or as part of the engines 108 and/or the rotatable proprotor gearbox systems 112. The electrical controllers 116 may be configured to output electrical power to one or more components of the aircraft 100, including the dampers 114 and the associated heaters thereof (e.g., spinner cap and rotor blade heaters). The encapsulated dampers of prior configurations may use a composite material that is "always on" in the sense that electrical power is supplied to the shell material to ensure that the temperature thereof does not drop below the freezing point of water in order to prevent ice accretion. As such, the power requirements may be very high for each damper 114. For example, to ensure an always on state for the encapsulated dampers, each damper may require 1000 W per rotor. As such, in this illustrative embodiment, six total dampers are used, and thus 6,000 W is required at all times to maintain anti-ice heat in the dampers. This power is supplied from the electrical controllers 116 which may include a generator or other power generation system connected to the rotatable proprotor gearbox systems 112. Additionally, the composite shell heater configuration require custom tooling for production and the materials temperature limited to about 300° F. The temperature limiting requires precise control to operate the shell heaters as anti-icers.

In view of this, and other considerations, embodiments of the present disclosure are directed to improved anti-ice pendulum dampers for use on aircraft and the like. Specifically, embodiments of the present disclosure include an integrated cartridge heater arranged within the damper material or structure. Such inclusion of cartridge heaters may not require any special tooling. Further, such cartridge heaters may have high temperature capabilities that can greatly simplify the control/power system and allow for evaporative anti-icing if necessary.

Pendulum dampers for aircraft use are typically produced from solid metal (e.g., tungsten). Because of the solid material/solid metal design, the geometry, shape, and design can be modified to incorporate an internal heater, as described herein. The cartridge heaters may be selected having high power densities (e.g., 200 W/in$^2$) and high running temperatures (e.g., 1,000° F.). The cartridge heaters may be installed in a slip-fit bore within the damper and retained with one or more internal retaining (e.g., snap)

rings, as described herein. In some embodiments, a minimum power density of the cartridge heaters may be about 10 W/in$^2$ and may reach a maximum power density of about 300 W/in$^2$. It will be appreciated that this range of 10-300 W/in$^2$ is for example only and the specific configuration of the cartridge heaters may be selected to achieve a desired operational temperature, which may be based, in part, on the amount of material of the pendulum damper to be heated.

Figure 2A:
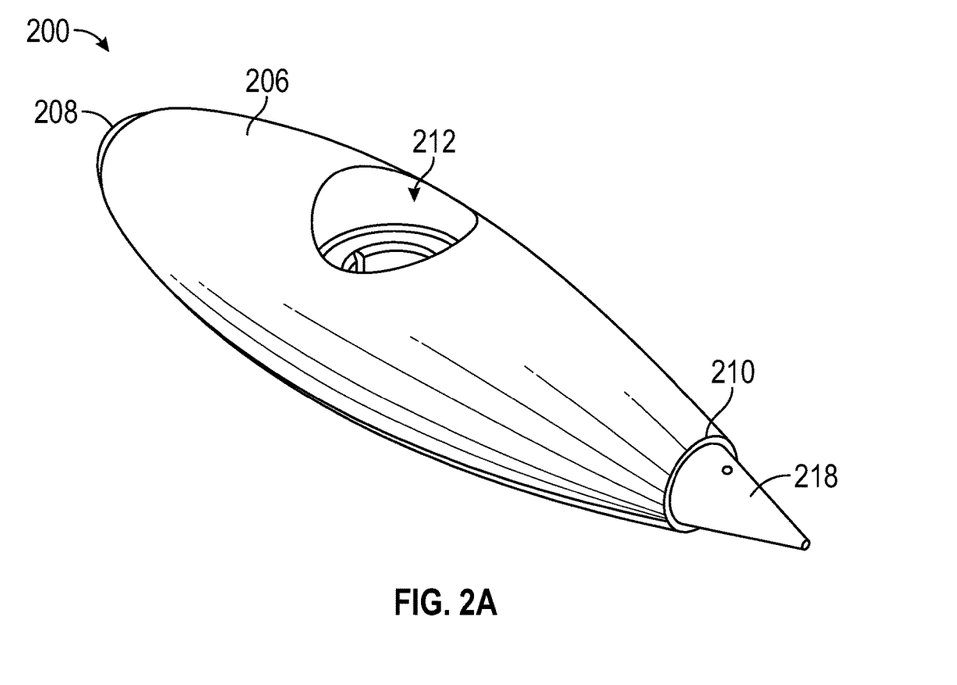
FIG. 2A is a perspective illustration of a pendulum damper in accordance with an embodiment of the present disclosure.
Figure 2B:
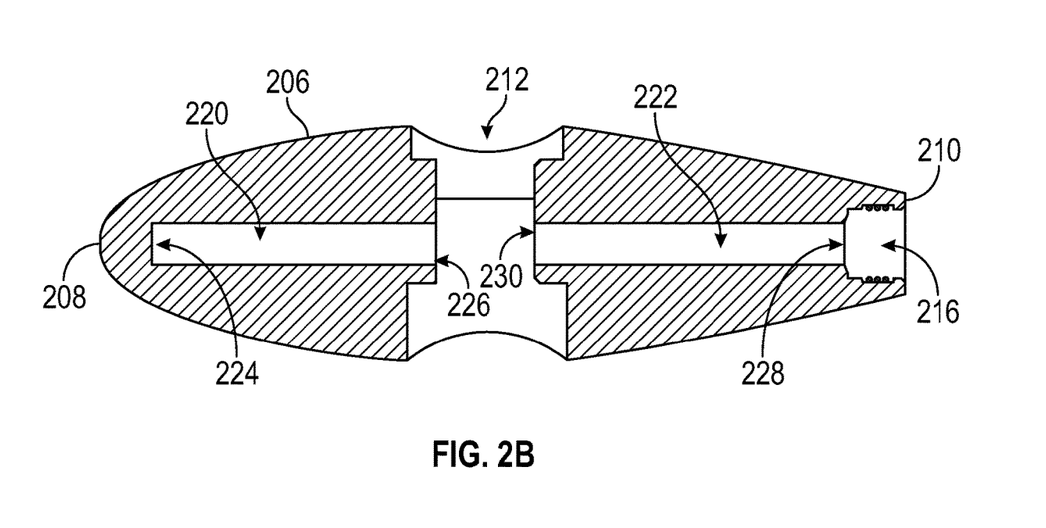
FIG. 2B is a cross-sectional illustration of the pendulum damper of FIG. 2A in accordance with an embodiment of the present disclosure.
Figure 2C:
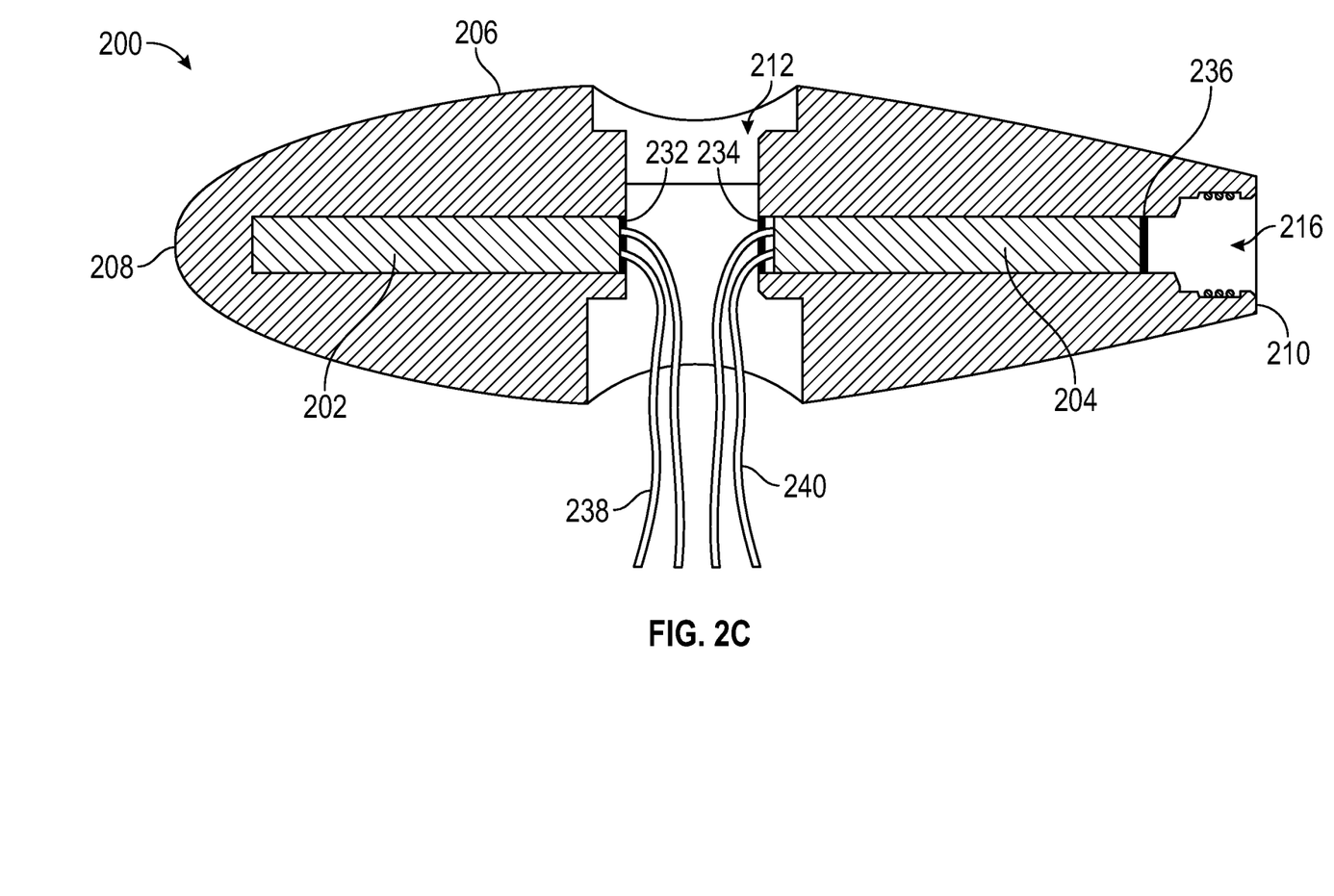
FIG. 2C is a cross-sectional illustration of the pendulum damper of FIG. 2A with cartridge heaters installed therein in accordance with an embodiment of the present disclosure.

Turning now to FIGS. 2A-2C, schematic illustrations of a pendulum damper 200 in accordance with an embodiment of the present disclosure are shown. The pendulum damper 200 is configured to be mounted or otherwise attached to a portion of an aircraft, such as a nose cone or other structure of a rotor assembly. For example, the pendulum damper 200 of this illustrative embodiment may be installed on an aircraft such as that shown in FIG. 1 in the location of the dampers 114 thereof. FIG. 2A is a perspective illustration of the pendulum damper 200, FIG. 2B is a cross-sectional view of the pendulum damper 200 without any installed heater elements, and FIG. 2C is a cross-sectional view of the pendulum damper 200 having cartridge heaters 202, 204 installed therein.

The pendulum damper 200 is substantially formed of a damper body 206. The damper body 206 is a substantially solid body formed of metal or the like. In some non-limiting embodiment, the body 206 is formed of solid tungsten. The damper body 206 is an elongated body having a first end 208 and a second end 210. The geometry of the damper body 200 may be designed for aerodynamic purposes, such that the first end 208 and the second end 210 may be formed to limit impact on rotation of a rotor system. As described herein, an axial direction is a direction between the first end 208 and the second end 210.

The damper body 206 includes a mounting bore 212 that passes through the damper body 206 in a direction normal to the axial direction. The mounting bore 212 is sized and shaped to receive, at least, a mounting bolt, screw, or other fastener to attach the pendulum damper 200 to a structure of an aircraft. In some embodiments, a portion of the mounting bore 212 may be threaded for threaded engagement between the fastener, the pendulum damper 200, and the structure to which the pendulum damper 200 is mounted. In other embodiments, the mounting bore 212 may not include any threads and may define a smooth bore or aperture through the damper body 206. The first end 208 of the damper body 206 is a solid structure that may have a nose cone or other aerodynamic shape/geometry and is closed/solid. The second end 210 of the damper body 206 includes a tail port 216 for attaching a tail element 218. In some embodiments, the tail element 218 may be threadedly connected to the damper body 206 within the tail port 216. In other embodiments, other mechanism for attaching the tail element 218 to the tail port 216 may be employed, including, without limitation, fasteners, interference/press fit, snap fit, brazing, welding, and the like.

In the axial direction, the damper body 206 includes a first heater bore 220 that extends in the axial direction from the mounting bore 212 toward the first end 208. The damper body 206 includes a second heater bore 222 that extends in the axial direction from the mounting bore 212 toward the second end 210. The first heater bore 220 has a closed first end 224 that is proximate the first end 208 of the damper body 206 and an open second end 226 that opens into the mounting bore 212. As such, the first heater bore 220 defines a cylindrical bore or slot within the material of the damper body 206. The second heater bore 222 has an open first end 228 that is open to the tail port 216 and a second end 230 that is open to the mounting bore 212. As such, the second heater bore 222 defines a through-hole or path through the damper body from the second end 210 to the mounting bore 212 and provides access to the first heater bore 220.

Referring now to FIG. 2C, the pendulum damper 200 is shown having a first cartridge heater 202 installed within the first heater bore 220 and a second cartridge heater 204 installed within the second heater bore 222. The first cartridge heater 202 may be installed within the first heater bore 220 by passing the first cartridge heater 202 through the tail port 216, through the second heater bore 222, through the mounting bore 212, and into the first heater bore 220. The first cartridge heater 202 may be retained within the first heater bore 220 by means of a first retaining element 232. The second cartridge heater 204 is installed after the first cartridge heater 202 and is installed through the tail port 216 and positioned within the second heater bore 222. The second cartridge heater 204 is retained within the second heater bore 222 by a second retaining element 234 and a third retaining element 236. After installation of the first and second cartridge heaters 202, 204, the tail element 218 may be threadedly installed at the second end 210 of the damper body 206 to create an aerodynamic body that also retains the second cartridge heater 204 within the damper body 206. It will be appreciated that in some embodiment, at least the third retaining element 236 may be omitted and the tail element 218 may provide retention functionality for the second cartridge heater 204 within the second heater bore 222.

The retaining elements 232, 234, 236 may be slip rings, plugs, or other structures that retain the cartridge heaters 202, 204 within the respective heater bores 220, 222. In some embodiments, the retaining elements 232, 234, 236 may be spring-loaded to provide vibration damping, support, and/or snug fit of the cartridge heaters 202, 204 within the heater bores 220, 222.

In some embodiments, each of the first heater bore 220 and the second heater bore 222 may be smooth bores with no surface features. Similarly, the cartridge heaters 202, 204 may have smooth exterior surfaces, and the cartridge heaters 202, 204 may be substantially free sitting within the respective heater bores 220, 222. In some such embodiments, the cartridge heaters 202, 204 and/or the interior surfaces of the heater bores 220, 222 may be coated with a thermally conductive coating or paste to ensure efficient heat transfer from the cartridge heaters 202, 204 to the material of the damper body 206. Such coatings may be formed from boron-based materials, for example. In other embodiments, a threaded engagement between the cartridge heaters 202, 204 and the heater bores 220, 222 may be employed. Those of skill in the art will appreciate that other types of direct connection or free connection may be employed without departing from the scope of the present disclosure. However, in every case, the arrangement is selected to enable heat transfer from the cartridge heaters 202, 204 to the material of the damper body 206.

The cartridge heaters 202, 204 are electrical components that require electrical power to generate heat. As such, the first cartridge heater 202 includes electrical wires 238 that enable electrical connection to a power source, such as an electrical controller (e.g., electrical controllers 116 shown in FIG. 1). Similarly, the second cartridge heater 204 includes electrical wires 240 that enable electrical connection to the power source. The first and second retaining element 232, 234 may include aperture(s) or hole(s) to allow the wires 238, 240 to pass therethrough without compromising the retaining of the cartridge heaters 202, 204 within the respective heater bores 220, 222.

Although described as cylindrical in nature, the geometry of the heater bores and/or the cartridge heaters are not limited to cylindrical configurations. For example, a box-like structure or geometry (e.g., square or rectangular cross-section) may be employed, or other geometric shapes (e.g., including, with respect to cross-sectional shape, triangular, oval, polygonal, etc.). In some such embodiments, a slot-groove configuration may be employed to assist in installation and orientation of the cartridge heaters within the heater bores. However, it may be advantageous to employ a circular cross-section such that orientation does not matter and maximum thermal contact between the cartridge heater and the material of the damper body may be achieved.

Figure 3:
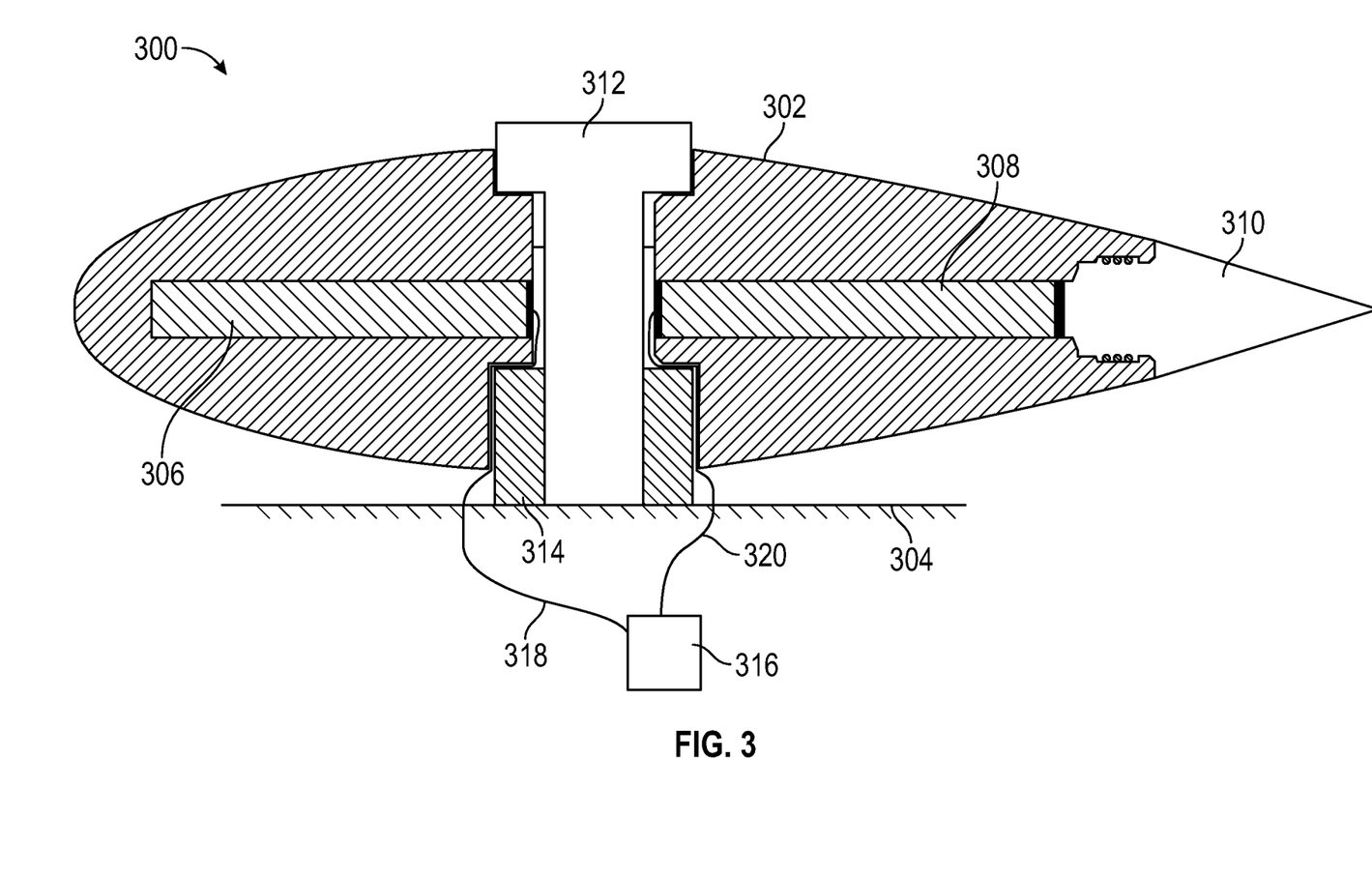
FIG. 3 is a schematic illustration of a heater assembly in accordance with an embodiment of the present disclosure.

Turning now to FIG. 3, a schematic illustration of a heater assembly 300 in accordance with an embodiment of the present disclosure is shown. The heater assembly 300 illustrates a pendulum damper 302 as installed to an aircraft structure 304 in accordance with an embodiment of the present disclosure. The pendulum damper 302 may be similar to that shown in FIGS. 2A-2C and the aircraft structure 304 may be similar to that shown in FIG. 1 (e.g., part of a tilt-rotor aircraft).

The pendulum damper 302 is configured having internal heaters in the form of a first cartridge heater 306 and a second cartridge heater 308 installed within respective heater bores, similar to that described above. In this embodiment, the pendulum damper 302 includes a tail element 310. The aircraft structure 304 may be a nose cone or other structure of an engine and/or a rotatable proprotor gearbox system. The pendulum damper 302 may be arranged 180 degrees (opposite) relative to a rotor blade to provide damping of vibrations that are generated by rotation of the rotor blade.

The pendulum damper 302 is mounted to the aircraft structure 304 by a fastener 312 that connects to a mounting structure 314 of the aircraft structure 304. The fastener 312 may threadedly engage and securely attach to the mounting structure 314. It will be appreciated by those of skill in the art that other types of attachment and mounting may be employed without departing from the scope of the present disclosure.

The cartridge heaters 306, 308 are electrically connected to an electrical controller 316 by respective wiring 318, 320. The electrical controller 316 may be a control system or part thereof for distributing electrical power through the aircraft, including heaters of rotor blades and the cartridge heaters 306, 308 along with distributing power to other components of the aircraft. The electrical controller 316 may include various electronic components including processors, memory, controller, input/output components, and the like, as will be appreciated by those of skill in the art. The power supplied through the electrical controller 316 to the cartridge heaters 306, 308 may be sourced from a power source of an aircraft, such as a generator operably coupled to a gas burning engine or the like.

The electrical controller 316 may be configured to selectively operate the cartridge heaters 306, 308. That is, rather than an always-on configuration, the cartridge heaters 306, 308 may be operated in a cyclical manner. This may be possible because the material of the pendulum damper 302 can retain heat for a period of time and further the cartridge heaters 306, 308 can be operated at high temperatures. As a result, the material of the pendulum damper 302 may retain the heat during off cycles of the cartridge heaters 306, 308.

This provides for the opportunity for power savings as the full power of the operation of the cartridge heaters 306, 308 may not be required to be always-on. For example, the thermal mass of the material of the pendulum damper (e.g., tungsten) may be very high and allow for heating to high temperatures during the on-state of the cartridge heaters 306, 308. When the cartridge heaters 306, 308 are switched to the off-state, although the pendulum dampers will relatively rapidly dissipate heat the heat may be sufficient such that the temperature of the pendulum damper never drops below a predetermined temperature (e.g., 50° F.). However, because of the high thermal mass of the pendulum dampers, the temperature of the cartridge heaters 306, 308 may be increased to very high temperatures without risk of damage (e.g., greater than 300° F., and even 1,000° F. or higher). Accordingly, even with a cyclical operation, the temperature of the pendulum dampers never drops into ranges that may risk ice accretion. This results in lower power consumption while also ensuring ice accretion or build-up on the pendulum dampers.

Figure 4:
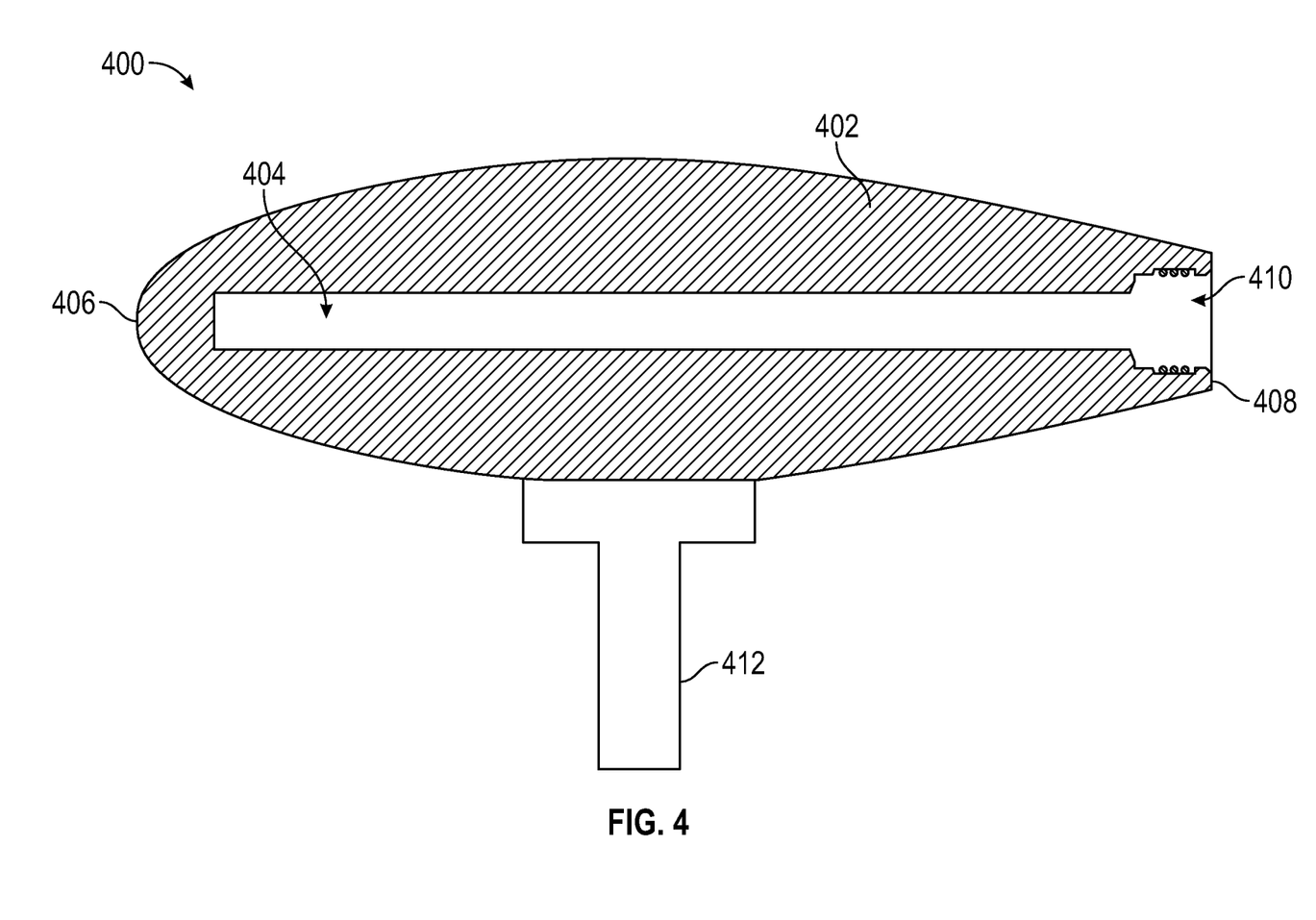
FIG. 4 is a schematic illustration of a heater assembly in accordance with an embodiment of the present disclosure.

Turning now to FIG. 4, a schematic illustration of a heater assembly 400 in accordance with an embodiment of the present disclosure is shown. The heater assembly 400 illustrates a pendulum damper 402 configured to be installed to an aircraft structure. The pendulum damper 402 may be similar to that shown and described above and the aircraft structure may be similar to that shown and described herein (e.g., part of a tilt-rotor aircraft). In this embodiment, the pendulum damper 402 includes a single heater bore 404 within the body of the pendulum damper 402. The pendulum damper 402 is an elongated structure extending between a first end 406 and a second end 408. The heater bore 404 extends through the interior of the body of the pendulum damper 402 from a tail port 410 at the second end 408 toward the first end 406.

A cartridge heater (not shown) may be installed into the heater bore 404 and secured in place by a tail element or cap, similar to that described above. In this embodiment, a single cartridge heater is used and the body of the pendulum damper 402 is provided with an attached fastener 412. The fastener 412 may be welded, brazed, integrally formed with, fastened to, or otherwise attached or connected to the body of the pendulum damper 402. The fastener 412 thus provides the connecting/mounting mechanism and a single cartridge heater may be installed within the heater bore 404 to provide heating to the material of the body of the pendulum heater 402, as described above. In some embodiments, the fastener 412 may be a standoff or pin-type structure that can be attached to an aircraft structure, and may not include threads, but rather may include through-holes, slots, apertures, or the like, for receiving another component to affix the heater assembly 400 to an aircraft structure.

In one non-limiting example of operation of the heated pendulum dampers of the present disclosure, the pendulum dampers may be power cycled with de-ice zones of a spinner cap (e.g., part of rotor). In such an example, the spinner cap may have three or four de-ice zones that are powered to be heated and prevent ice accumulation and/or accretion. During the heating cycle of the different de-ice zones of the spinner cap, the pendulum damper(s) may receive power and increase in temperature between each operation of the spinner de-ice zones in order to maintain an appropriate anti-ice temperature in the pendulum damper(s). As such, the de-icing and/or anti-ice operation of the pendulums may be integrated into the ice management of other components of the aircraft, rather than requiring a dedicated power supply.

Advantageously, embodiments of the present disclosure are directed to improved pendulum dampers for aircraft. Advantageously, the pendulum dampers described herein provide for improved anti-ice operation. Cartridge heaters are installed within the body of the pendulum damper to conduct heat into the material of the damper. The material of the damper will absorb and retain the heat for a period of time, thus enabling a cyclical operation thereof. Moreover, because no shell or other composite material is employed, the temperatures of the heaters and thus the dampers may be set to much higher temperatures than prior configurations, further improving operation thereof an ensuring prevention of ice accretion on the dampers. Moreover, the cartridge heaters may be operationally controlled for temperature, during of on-states, activation of on/off states, and the like. As such, the pendulum dampers of the present disclosure enable improved control regarding thermal properties and prevention of ice accretion in addition to enabling evaporative anti-icing (e.g., any liquid water that hits the surface will evaporate as opposed to turning into a liquid and running along/off the surface).

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A pendulum damper comprising:
   a damper body having a first end and a second end, with an axial direction defined between the first end and the second end with a heater bore passing through the damper body in the axial direction from a tail port at the second end toward the first end; and
   a cartridge heater installed within the heater bore, the cartridge heater configured to generate heat and heat a material of the damper body.

2. The pendulum damper of claim 1, further comprising a mounting bore passing through the damper body in a direction normal to the axial direction and separating the heater bore into a first heater bore and a second heater bore.

3. The pendulum damper of claim 2, further comprising a fastener configured to pass through the mounting bore to attach the damper body to an aircraft structure.

4. The pendulum damper of claim 2, wherein the cartridge heater is a first cartridge heater installed within the first heater bore, the pendulum damper further comprising a second cartridge heater installed within the second heater bore.

5. The pendulum damper of claim 4, wherein the first cartridge heater and the second cartridge heater each include wire to electrically connect the respective cartridge heater to an electrical controller.

6. The pendulum damper of claim 1, further comprising a tail element installed to the damper body and engaged into the tail port.

7. The pendulum damper of claim 1, wherein the damper body is a solid body of tungsten.

8. The pendulum damper of claim 1, further comprising a thermal paste disposed between the cartridge heater and the material of the damper body.

9. The pendulum damper of claim 1, wherein the cartridge heater has a power density of 10 W/in$^2$.

10. The pendulum damper of claim 1, wherein the cartridge heater has a power density of 300 W/in$^2$.

11. The pendulum damper of claim 1, further comprising a fastener connected to the damper body and configured to attach the damper body to an aircraft structure.

12. A pendulum damper heater system comprising:
    an electrical controller;
    a damper body having a first end and a second end, with an axial direction defined between the first end and the second end with a heater bore passing through the damper body in the axial direction from a tail port at the second end toward the first end; and
    a cartridge heater installed within the heater bore and electrically connected to the electrical controller,
    wherein the electrical controller is configured to control an on state and an off state of the cartridge heater.

13. The pendulum damper heater system of claim 12, further comprising a mounting bore passing through the damper body in a direction normal to the axial direction and separating the heater bore into a first heater bore and a second heater bore.

14. The pendulum damper heater system of claim 13, further comprising a fastener configured to pass through the mounting bore to attach the damper body to an aircraft structure.

15. The pendulum damper heater system of claim 13, wherein the cartridge heater is a first cartridge heater installed within the first heater bore, the system further comprising a second cartridge heater installed within the second heater bore.

16. The pendulum damper heater system of claim 15, wherein the first cartridge heater and the second cartridge heater each include wire to electrically connect the respective cartridge heater to the electrical controller.

17. The pendulum damper heater system of claim 12, wherein the cartridge heater is controlled to heat to temperatures above 300° F.

18. The pendulum damper heater system of claim 12, wherein the cartridge heater is controlled to heat to temperatures above 1,000° F.

19. The pendulum damper heater system of claim 12, wherein the electrical controller is configured to be operably connected to a power source of an aircraft.

20. The pendulum damper heater system of claim 12, wherein the electrical controller cyclically switches between the on state and the off state of the cartridge heater.

* * * * *